United States Patent Office 3,203,818
Patented Aug. 31, 1965

3,203,818
PHOTOCHEMICALLY STABLE RUTILE PIGMENTS
AND METHOD FOR PRODUCING SAME
Heinz Rechmann, Opladen, Friedrich W. Vial, Leichlingen, and Heinz Helmut Weber, Leverkusen, Germany, assignors to Titangesellschaft m.b.H., Leverkusen, Germany, a corporation of Germany
No Drawing. Filed Oct. 31, 1961, Ser. No. 148,840
Claims priority, application Germany, Nov. 2, 1960,
T 19,218
6 Claims. (Cl. 106—300)

The present invention relates in general to a photochemically stable rutile titanium dioxide pigment and to an improved process for producing the same; and to the use thereof in the production of photochemically stable resinous materials.

The characteristic photochemical activity of rutile titanium dioxide, upon exposure to light, has impaired the usefulness of rutile titanium dioxide pigment in several fields of application and in particular its use as an opacifier or coloring agent in resins such as melamine and urea formaldehyde resins, and in resinous materials. For example, pressed sheets of laminates produced from rutile $TiO_2$-containing papers and melamine formaldehyde resins turned definitely gray when exposed to sunlight.

Attempts dating back a long time have been made to reduce the photochemical activity of rutile titanium dioxide pigment by subjecting the pigment to various post-calcination treatments. For example, the calcined and milled pigment has been slurried in water, with the addition of a dispersing agent and alkali and, as the case may be, subjected to wet milling and/or hydroclassification; then treated in any desired sequence with a water soluble silicate and/or a water soluble aluminum salt, or, if desired, with other water soluble metal salts, forming colorless oxides, followed by the addition of an alkali or ammonia to neutralize the slurry and form insoluble hydrous oxides on the pigment. Thereafter the slurry has been filtered, to recover the hydrous oxide treated pigment which is subsequently washed, dried and milled. Calcined rutile titanium dioxide so treated shows improved resistance to chalking, but is not photochemically stable when used in resins and resinous materials. Consequently, efforts have been continued to produce a rutile titanium dioxide pigment having photochemical stability. Thus accordng to another procedure a calcined rutile titanim dioxide pigment is treated with the hydrous oxides of silica and alumina and subjected to a post-treatment calcination, sometimes referred to as a second calcination, to form a coating on the pigment of aluminum silicate or of the oxides of aluminum and silicon; while in yet another procedure stabilization was attempted by a post-calcination treatment with the combination of hydrous silica, alumina and ceria.

While both of the aforementioned procedures effect substantial improvements in the photochemical stability of the pigment even improvements of this order have not been sufficient to meet the requirements of the industry in some cases.

An object, therefore, of the present invention is to provide a calcined titanium dioxide pigment of exceptionally high photochemical stability.

A further object of the invention is to provide an improved method for producing a calcined rutile titanium dioxide pigment of exceptionally high photochemical stability.

A still further object of the invention is to provide a rutile titanium dioxide-pigmented resinous material which is highly resistant to decolorization when exposed to ultra violet light.

These and other objects, features and advantages of the instant invention are described in detail in the specification which follows.

In its broadest sense the present invention relates to a photochemically stable rutile titanium dioxide pigment produced by subjecting a post-calcination treated rutile pigment to a second calcination followed by a second treatment with colorless hydrous metal oxides and subsequent drying; and to photochemically stable resinous materials produced by incorporating therein the superior photochemically stable rutile titanium dioxide pigment of this invention.

In carrying out the invention the calcined rutile titanium dioxide used as the starting material is obtained according to any of the known procedures of the art including calcining, to the rutile modification, titanium dioxide hydrate prepared by thermal hydrolysis of titanium sulfate solutions, or by various chlorination procedures, or from slags consisting mainly of titanium dioxide. This calcined rutile titanium dioxide pigment is subjected to a first post-calcination treatment wherein the calcined pigment is slurried in water, with the aid of a dispersing agent and with the addition of an alkali, if desired, after which the dispersed slurry is wet-milled and/or hydro-classified as the case may be.

The slurry is then heated to a temperature of about 60° C. and to this slurry is added, in any desired sequence, certain ionizable water soluble metal salts, as for example, a water soluble silicon salt, a water soluble aluminum salt or other water soluble colorless oxide forming metal salts or mixtures thereof, the salts of silicon and aluminum being added in amounts such that the total amount of hydrous oxides added range from 2 to no more than 15% by weight of the $TiO_2$. The minimal amounts of the soluble metal salts used are about 0.5% of each soluble salt calculated as oxide, on the basis of the titanium dioxide treated. There is no upper limit for the amount of soluble salts added other than economy; however, in practice no more than about 5% of each soluble salt, calculated as the oxide, is employed. Following the addition of the soluble salts, an alkali or an aqueous solution of dilute ammonium is added to the heated slurry so as to adjust the pH of the slurry to from 7 to about 8.1 and precipitate the soluble metal salts as insoluble hydrous oxides. Thereafter, the slurry is filtered to recover the hydrous oxide coated pigment which is then washed, dried at about 120° C. and milled.

Following the first post-calcination treatment the hydrous metal oxide coated pigment is calcined, this post-treatment calcination being referred to hereinafter as a second calcination. The temperature of the second calcination has been found to have a significant influence on the properties of a pigment finished according to the method of the instant invention. It has been discovered that the photochemical stability of the pigment increases with increased calcination temperatures but that brightness and tone are impaired. Hence, the second calcination should be carried out within a temperature range from about 600° C. to 800° C. and preferably from about 700° C. to 750° C.

Following the second calcination the pigment is dry milled and then given a second coating of hydrous metal oxides by a treatment hereinafter referred to as the second post-calcination treatment wherein the pigment is slurried in water, wet-milled and/or hydro-classified, as the case may be, and treated with additional water soluble salts in much the same manner as was done in the first post-calcination treatment. Water soluble salts of silicon and/or aluminum and/or other colorless hydrous oxide forming metals, if desired, in amounts from about 0.5–5.0%; and a water soluble cerium salt, as the case may be, in amounts from about 0.1–1.0%, all amounts calculated as oxides on the basis of the titanium dioxide being treated, are added to the heated slurry which is then neutralized to precipitate the second coating of hydrous oxides on the pigment. Thereafter the slurry is filtered to recover the hydrous oxide coated pigment and the latter is washed, dried at about 120° C. and milled. The coating of the hydrous oxides of silicon, aluminum, cerium and other metals, as the case may be, or mixtures thereof, deposited on the calcined pigment by this second treatment is not calcined but merely dried and has been found to produce a pronounced improvement in the photochemical stability of the pigments. The term "dried" as used hereinafter with reference to the second post-calcination treatment shall be understood to mean partially dehydrating the hydrous oxides at temperatures below calcination temperature.

In some cases there was a noticeable decrease in brightness of the pigment when a soluble cerium salt alone was used but it was discovered that this could be overcome by combining the water soluble cerium salt, in an amount from about 0.1% to 1.0%, with water soluble silicon and aluminum salts in amounts from 0.5–5.0% in the second post-calcination treatment. Pigments finished in this manner not only have exceptionally high photochemical stability but high brightness.

As shown by the following examples, a calcined rutile titanium dioxide pigment having a first post-calcination treatment with the hydrous oxides of silicon and aluminum, or silicon, aluminum and cerium, with or without a second calcination, has, when tested in the manner hereinafter described, a relatively high graying rating, i.e., from 2.6% to greater than 12%, the higher values corresponding to pigments having no second calcination. In contradistinction it has been discovered that a calcined rutile titanium dioxide pigment treated with the hydrous oxides of silicon and aluminum and subjected to a second calcination followed by a second post-calcination treatment with the hydrous oxides of silicon, aluminum and cerium, either alone or in combinations of two or more, has percent graying values as low as 0.4% to no higher than 1.4%. In short, calcined rutile pigments treated according to the process of this invention have exceptionally high photochemical stability as well as high brightness.

One specific application of the invention is in the field of resinous materials, and in particular paper laminates opacified with the photochemically stable titanium dioxide pigments of this invention. Hence, for the purpose of testing the rutile pigments made according to this invention the pigments were incorporated in laminate papers which were then impregnated with a resin, such as for example, melamine formaldehyde resin or urea formaldehyde resin, in a solution of water and alcohol. After the resin impregnated paper was dried a plurality of sheets of the impregnated paper were superimposed and formed into pigment opacified resinous paper laminate by well-known hot pressing techniques. Specifically, the following procedure was practiced: A laminated paper was prepared from paper stock having the following composition:

80% sulfite cellulose "Zewa Excellent" extra white
20% sulfate cellulose "Royal Bleached" milling degree 23° SR
3% "Nadavin" FP on cellulose (absolutely dry)
50% rutile pigment (of this invention)
Weight of sheet: 160 g.
Ash content: 23–24%

A laminate paper of this composition was twice saturated with 50% aqueous solution of melamine formaldehyde resin ("Madurit" T2 extra or Cassella A.G.). After each saturation the saturated paper was dried in an oven at 130° C. for 10 minutes to precondense the resin. Subsequently, the resin impregnated paper was arranged in two layers between two highly polished chromium plated steel platens, using an overlay paper, a dry adhesive foil and an aluminum foil as core, and molded for 10 minutes at 140° C. under pressure of 45 kg./sq. cm. The molded laminate was then exposed in a "Xenotest" apparatus for a predetermined (normal) cycle. After exposure in the aforesaid apparatus the gray discoloration rating of the molded paper laminate was determined in an "Elrepho" instrument manufactured by Zeiss, the gray discoloration rating being expressed as the percent reduction of light remission measured through a green filter after an exposure of 24 hours.

While the above described procedure for preparing paper laminates is the one used for illustrating the present invention it will be understood that this is not restrictive of the invention and that other techniques may be employed. Thus for example, a paper laminate paper may be prepared by impregnating unpigmented paper with a slurry consisting of the pigment of this invention and a formaldehyde resin in a solution of water and alcohol.

To determine the brightness and tone of the pigments made according to the method of the instant invention, 11.5 grams of the pigment are rubbed-up with 3 ml. of linseed oil in an automatic muller. The brightness and tone of the pigment pastes so formed were then measured using the differential colorimeter, "Colormaster."

To further illustrate the invention the following examples are given. All of the products made according to these examples were tested as described above with respect to photochemical stability, brightness and tone. The results are recorded in the table which follows the examples.

EXAMPLE 1

A calcined rutile pigment, prepared in accordance with any of the normal procedures of the art, was slurried in demineralized water with the aid of a dispersing agent. The dispersion was freed from all coarse constituents by wet ball milling and classification in a centrifuge. The classified calcined rutile pigment was then given a first post-calcination treatment by heating one liter of the pigment slurry, equalling 300 grams titanium dioxide, to 60° C. in a three-neck flask. To this slurry the following additions were made consecutively while maintaining the temperature substantially constant:

(1) 28.5 ml. of a sodium silicate solution having a silicon content of 190 g.p.l. $SiO_2$ corresponding to 1.8% $SiO_2$ on a pigment weight basis, followed by stirring for 10 minutes;
(2) A solution of 41.2 grams of $Al_2(SO_4)_3 \cdot 18\ H_2O$ in 100 ml. of water, corresponding to 2.1% $Al_2O_3$ calculated on the weight of pigment used, following by 10 minutes stirring;
(3) Dilute ammonia solution to maintain the pH value of the slurry at about 8.1 followed by 30 minutes stirring.

The pH of the suspension was frequently checked and maintained constant at about 8.1 by the addition, when necessary, of dilute ammonia. The suspension was then dewatered by suction to recover the hydrous oxide coated titanium dioxide pigment which was then washed repeatedly with water and dried in an electric drying oven at 120° C. for about 15 hours. The hydrous oxide coated pigment was subsequently milled. 300 grams of this post-calcination treated pigment was then given a post-treatment calcination (i.e., second calcination) in an electric furnace in which the pigment was heated for 2 hours at 750° C. Following this second calcination the pigment was cooled and milled. For further photochemical stabilization the post-treatment calcined pigment was again treated, i.e., given a second post-calcination treatment as follows:

300 grams of the calcined pigment were slurried in demineralized water with the addition of sodium hemametaphosphate as dispersing agent and sodium hydroxide, the volume of the suspension being 1 liter and the pH value from 9.5–10.0. Any coarse aggregates which had formed during the second calcination were ground by wet ball milling. The slurry was then heated to 60° C. and the following additions were made:

(1) A solution of 19.6 grams $Al_2(SO_4)_3 \cdot H_2O$ in 50 ml. of water corresponding to 1% $Al_2O_3$ on the basis of $TiO_2$ treated, followed by stirring for 10 minutes;
(2) Dilute ammonia up to pH of 8.1 followed by stirring for 30 minutes and adjustment of the pH of the slurry to 8.1.

The suspension was then dewatered and washed repeatedly with demineralized water. The resulting pigment was dried in an electric oven at 120° C. for about 15 hours and thereafter milled in a jet mill.

EXAMPLE 2

A calcined rutile pigment was given a post-calcination treatment similar to that described in Example 1 followed by a second calcination at 750° C. for 2 hours after which 300 grams of the pigment were slurried in 1 liter of demineralized water, wet ball milled to grind the coarse fractions, and the slurry heated to 60° C., as in Example 1, whereupon the following additions were made to the slurry:

(1) 15.8 ml. of a water glass solution containing 190 grams/liter $SiO_2$, corresponding to 1.0% $SiO_2$ on the basis of $TiO_2$ used, followed by stirring for 10 minutes;
(2) A solution of 19.6 grams $Al_2(SO_4)_3 \cdot 18H_2O$ in 50 ml. of water corresponding to 1% $Al_2O_3$ on the basis of the $TiO_2$ used, followed by stirring for 10 minutes;
(3) Dilute ammonia solution up to pH of 8.1, followed by a stirring period of 30 minutes, after which the pH was readjusted to 8.1.

The suspension was dewatered and washed repeatedly with demineralized water and the pigment cake was then dried in an electric oven at 120° C. for about 15 hours. Subsequently, the dried pigment was milled in a jet mill.

EXAMPLE 3

A calcined rutile pigment having a post-calcination treatment like that described in Example 1 followed by post-treatment calcination in an electric furnace for two hours at a temperature of 750° C. was further stabilized by treating the slurry with the following additions.

(1) A solution of 2.12 g. $Ce(SO_4)_2 \cdot 4H_2O$ in 10 ml. of water corresponding to 0.3% $CeO_2$, on the basis of the basis of the $TiO_2$ used. The slurry was then stirred for 10 minutes.
(2) Dilute ammonia was added to the slurry followed by stirring for 30 minutes—bringing the pH up to about 8.1.

The suspension was then dewatered and washed repeatedly with demineralized water and the resulting pigment cake was then dried in an electric oven at 120° C. for about 15 hours. The pigment was finished by grinding in a jet mill.

EXAMPLE 4

A calcined rutile pigment, was given a post-calcination treatment followed by a second calcination as described in Example 1, after which it was slurried in water, in the manner described in Example 1, and then given a second post-calcination treatment which was carried out by making the following additions to the pigment slurry.

(1) 15.8 ml. of water glass solution with a content of 190 g.p.l. $SiO_2$, corresponding to 1% $SiO_2$ on the basis of the $TiO_2$ used, followed by stirring for 10 minutes;
(2) A solution of 19.6 g. $Al_2(SO_4)_3 \cdot 18H_2O$ in 50 ml. of water, corresponding to 1% $Al_2O_3$ on the basis of the $TiO_2$ used, followed by stirring for 10 minutes;
(3) A solution of 2.12 g. $Ce(SO_4)_2 \cdot 4H_2O$ in 10 ml. of water corresponding to 0.3% $CeO_2$ on the basis of the $TiO_2$ used. The stirring time after this addition was 10 minutes.
(4) To this suspension a dilute ammonia solution was added to adjust a pH to about 8.1, the suspension then being stirred for about 30 minutes.

The suspension was then dewatered and washed repeatedly with diminералized water and the resulting pigment cake was dried in an electric oven at 120° C. for about 15 hours. The dried pigment was then milled in a jet mill.

The treatments produced according to the foregoing examples are compared in the following table, with calcined rutile pigment controls which had received only one post-calcination treatment with the metal salts of silicon and aluminum; or silicon aluminum and cerium; or one such post-calcination treatment followed by a second calcination.

Table

| Example No. | Treatment of the Pigments | | | Graying, percent [1] | Brightness and tone | |
|---|---|---|---|---|---|---|
| | First Post-Treatment With— | Second Calcination at— | Second Post-Treatment With— | | $R_G^2$, percent | $R_R - R_B^2$, percent |
| | | °C. | | | | |
| 1 | 1.8% $SiO_2$ / 2.1% $Al_2O_3$ | 750 | 1.0% $Al_2O_3$ | 1.4 | 91.15 | 8.03 |
| 2 | 1.8% $SiO_2$ / 2.1% $Al_2O_3$ | 750 | 1.0% $SiO_2$ / 1.0% $Al_2O_3$ | 0.6 | 91.50 | 7.80 |
| 3 | 1.8% $SiO_2$ / 2.1% $Al_2O_3$ | 750 | 1.0% $Al_2O_3$ / 0.3% $CeO_2$ | 0.4 | 88.00 | 6.87 |
| 4 | 1.8% $SiO_2$ / 2.1% $Al_2O_3$ | 750 | 1.0% $SiO_2$ / 1.0% $Al_2O_3$ / 0.3% $CeO_2$ | 0.5 | 91.50 | 7.80 |
| Control | 1.8% $SiO_2$ / 2.1% $Al_2O_3$ | | | >12 | 91.50 | 7.33 |
| Control | 1.8% $SiO_2$ / 2.1% $Al_2O_3$ / 0.3% $CeO_2$ | | | ca. 8 | 91.50 | 9.64 |
| Control | 1.8% $SiO_2$ / 2.1% $Al_2O_3$ | 750 | | 2.6 | 91.80 | 8.26 |

[1] Percent graying=decrease of the remission measured with green filter after an exposure of 24 hours calculated in percent of the initial remission.
[2] $R_G$=remission in green filter; $R_R$=remission in red filter; $R_B$=remission in blue filter.

From the foregoing description and the data recorded in the table it is evident that a calcined rutile pigment treated according to the process of this invention is substantially superior, with respect to photochemical stability, to calcined rutile pigments made according to prior procedures in the art; and that the pigments of this invention also exhibit good brightness and tone. In this connection it is noteworthy that the second post-calcination treatment with hydrated cerium oxide alone produced excellent photochemical stability although the brightness and tone of the pigment leaves something to be desired (see table, Example 3). However, the down-grading influence of the hydrous cerium oxide on brightness and tone has been counteracted by the additional use of hydrated alumina and silica in the second post-calcination treatment without impairing the good photochemical stabilizing effect of the hydrous cerium oxide (see table, Example 4).

The invention may be carried out in other specific ways than these hereinsetforth without departing from the spirit and essential characteristics of the invention, and the present embodiments, are therefore, to be considered in all respects as illustrative and not restrictive and all modifications coming within the meaning and equivalency range of the appended claims are intended to be embraced thereby.

We claim:

1. In a process for producing a photochemically stable rutile $TiO_2$ pigment wherein a calcined rutile $TiO_2$ pigment, in aqueous slurry, is coated with the hydrous metal oxides of silicon and aluminum in amounts, as $SiO_2$ and $Al_2O_3$, respectively, in the range of from 0.5 to 5.0% respectively on a $TiO_2$ weight basis, and the so-coated pigment is then calcined at a temperature from 600° C to 800° C. to produce a double calcined metal oxide coated rutile $TiO_2$ pigment, the improvement comprising: treating said double calcined coated pigment, in aqueous slurry, with a second coating of at least one hydrous metal oxide selected from the group consisting of the hydrous metal oxides of silicon, aluminum and cerium, and mixtures thereof, the amount of hydrous metal oxides of silicon and aluminum being in the range of from 0.5 to 5.0% by weight of $TiO_2$, and the amount of hydrous cerium being in the range of from 0.1 to 1.0%, and then heating said pigment to a temperature of about 120° C. to dry said second hydrous metal oxide coating.

2. Process according to claim 1 wherein the second hydrous metal oxide coating consists of the hydrous oxide of aluminum, the amount of aluminum, as $Al_2O_3$, being in the range of from 0.5% to 5.0% by weight of $TiO_2$.

3. A photochemically stable calcined rutile $TiO_2$ pigment having a calcined coating on said pigment consisting of silicon oxide and aluminum oxide in an amount, as $SiO_2$ and $Al_2O_3$ respectively, in the range of from 0.5 to 5.0% respectively on a $TiO_2$ weight basis and characterized by a superimposed dried hydrous metal oxide coating consisting of at least one hydrous metal oxide selected from the group consisting of the hydrous oxides of silicon, aluminum, and cerium the amount of hydrous metal oxides of silicon and aluminum being in the range from 0.5% to 5.0% by weight of $TiO_2$, and the amount of hydrous cerium oxide being in the range from 0.1% to 1.0%.

4. A photochemically stable calcined rutile $TiO_2$ pigment according to claim 3 wherein the superposed dried hydrous metal oxide coating consists of hydrous aluminum oxide in an amount from 0.5% to 5.0% by weight of $TiO_2$.

5. A pigment opacified photochemically stable resinous material consisting essentially of a material selected from the group consisting of melamine formaldehyde resin and urea formaldehyde resin and a pigmentary opacifier according to claim 3 distributed uniformly throughout said resin.

6. A photochemically stable paper laminate opacified with a pigmentary opacifier according to claim 3.

References Cited by the Examiner

UNITED STATES PATENTS

| | | | |
|---|---|---|---|
| 1,892,693 | 1/33 | Blumenfeld et al. | 106—300 |
| 2,357,101 | 8/44 | Geddes | 106—300 |
| 2,671,031 | 3/54 | Whately | 106—300 |
| 3,035,966 | 5/62 | Siuta | 260—39 |
| 3,086,877 | 4/63 | Sheehan et al. | 106—300 |

TOBIAS E. LEVOW, *Primary Examiner.*

JOHN H. MACK, *Examiner.*